US009510129B2

(12) United States Patent
Itoh et al.

(10) Patent No.: US 9,510,129 B2
(45) Date of Patent: Nov. 29, 2016

(54) CHARACTER HITCHHIKE INFORMATION PROCESSING DEVICE, CHARACTER HITCHHIKE INFORMATION PROCESSING SYSTEM, AND COMPUTER READABLE MEDIUM

(71) Applicant: PFU Limited, Kahoku-shi, Ishikawa (JP)

(72) Inventors: Yasunari Itoh, Ishikawa (JP); Chiharu Seto, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 245 days.

(21) Appl. No.: 14/213,114

(22) Filed: Mar. 14, 2014

(65) Prior Publication Data
US 2014/0289362 A1 Sep. 25, 2014

(30) Foreign Application Priority Data

Mar. 19, 2013 (JP) ................................ 2013-057085

(51) Int. Cl.
*A63F 9/24* (2006.01)
*H04W 4/00* (2009.01)

(52) U.S. Cl.
CPC ........ *H04W 4/001* (2013.01); *A63F 2300/204* (2013.01); *A63F 2300/5573* (2013.01); *A63F 2300/69* (2013.01); *A63F 2300/8082* (2013.01)

(58) Field of Classification Search
None
See application file for complete search history.

(56) References Cited

U.S. PATENT DOCUMENTS

| 8,968,099 | B1* | 3/2015 | Hanke | A63F 13/57 463/42 |
| 2005/0272504 | A1* | 12/2005 | Eguchi | A63F 13/10 463/40 |
| 2011/0319148 | A1* | 12/2011 | Kinnebrew | A63F 13/216 463/1 |
| 2012/0142434 | A1* | 6/2012 | Haruki | A63F 13/10 463/43 |
| 2013/0178257 | A1* | 7/2013 | Langseth | G06T 17/05 463/4 |
| 2013/0194278 | A1* | 8/2013 | Zajac, III | A63F 13/10 345/473 |
| 2014/0128146 | A1* | 5/2014 | Story, Jr. | A63F 9/24 463/23 |

FOREIGN PATENT DOCUMENTS

| JP | 2012-120594 A | 6/2012 |
| JP | 2012-212225 A | 11/2012 |

OTHER PUBLICATIONS

English Translation Notification of Reasons for Refusal Japanese Patent Application No. 2013-057085 dated May 24, 2016.

\* cited by examiner

*Primary Examiner* — Jason Yen
(74) *Attorney, Agent, or Firm* — McDermott Will & Emery LLP

(57) ABSTRACT

There is provided an information processing device having: a storage unit configured to store a location information on real space associated with a character displayed on a portable terminal; a location updating unit configured to, when the character is associated with a portable terminal, update the location information stored in the storage unit based on a location information of the associated portable terminal; and an associating unit configured to, when the character is not associated with any portable terminal, associate a portable terminal with the character based on the location information stored in the storage unit and the location information of the portable terminal.

9 Claims, 18 Drawing Sheets

Character hitchhike system 1

Management server 4

Fixed terminal 2

Portable terminal 3

Data structure

Extended real photo generating processing (S10)

Completion determining processing (S20)

Interruption/recovery processing (S30)

Message issuing processing (S40)

Lobby image viewed at Haneda airport through portable terminal application

Application screen when character taken is left at bus station

Composite photo taken at Kenrokuen

Screen example of communication via character

CHARACTER HITCHHIKE INFORMATION PROCESSING DEVICE, CHARACTER HITCHHIKE INFORMATION PROCESSING SYSTEM, AND COMPUTER READABLE MEDIUM

CROSS-REFERENCE TO RELATED APPLICATIONS

This application is based on and claims priority under 35 USC 119 from Japanese Patent Application No. 2013-057085 filed Mar. 19, 2013.

FIELD

The invention relates to an information processing device, an information processing system, and a computer readable medium.

BACKGROUND

Japanese Patent Application Laid-Open (JP-A) No. 2012-120594 discloses a system in which a character can wait for pick-up by an owner of another game machine at an access point.

SUMMARY

According to an aspect of the invention, there is provided an information processing device having: a storage unit configured to store a location information on real space associated with a character displayed on a portable terminal; a location updating unit configured to, when the character is associated with a portable terminal, update the location information stored in the storage unit based on a location information of the associated portable terminal; and an associating unit configured to, when the character is not associated with any portable terminal, associate a portable terminal with the character based on the location information stored in the storage unit and the location information of the portable terminal.

According to another aspect of the invention, there is provided an information processing system having: a portable terminal and an information processing device, wherein the information processing device includes: a storage unit configured to store a location information on real space associated with a character displayed on a portable terminal; a location updating unit configured to, when the character is associated with the portable terminal, update the location information stored in the storage unit based on the location information of the associated portable terminal; and an associating unit configured to, when the character is not associated with any portable terminal, associate a portable terminal with the character based on the location information stored in the storage unit and location information of the portable terminal, and wherein the portable terminal transmits location information of the portable terminal to the information processing device, at least when associated with the character.

According to another aspect of the invention, there is provided a non-transitory computer-readable medium storing thereon a computer program that causes a computer to perform a method comprising: updating a location information of a character on real space stored in a database, when the character displayed on a portable terminal is associated with the portable terminal, based on a location information of the associated portable terminal; and associating a portable terminal with the character, when the character is not associated with any portable terminal, based on the location information stored in the database and the location information of the portable terminal.

BRIEF DESCRIPTION OF THE DRAWINGS

Exemplary embodiments of the present invention will be described in detail based on the following figures.

DESCRIPTION OF EMBODIMENTS

An embodiment of the present invention will be described below with reference to drawings.

Figure 1:
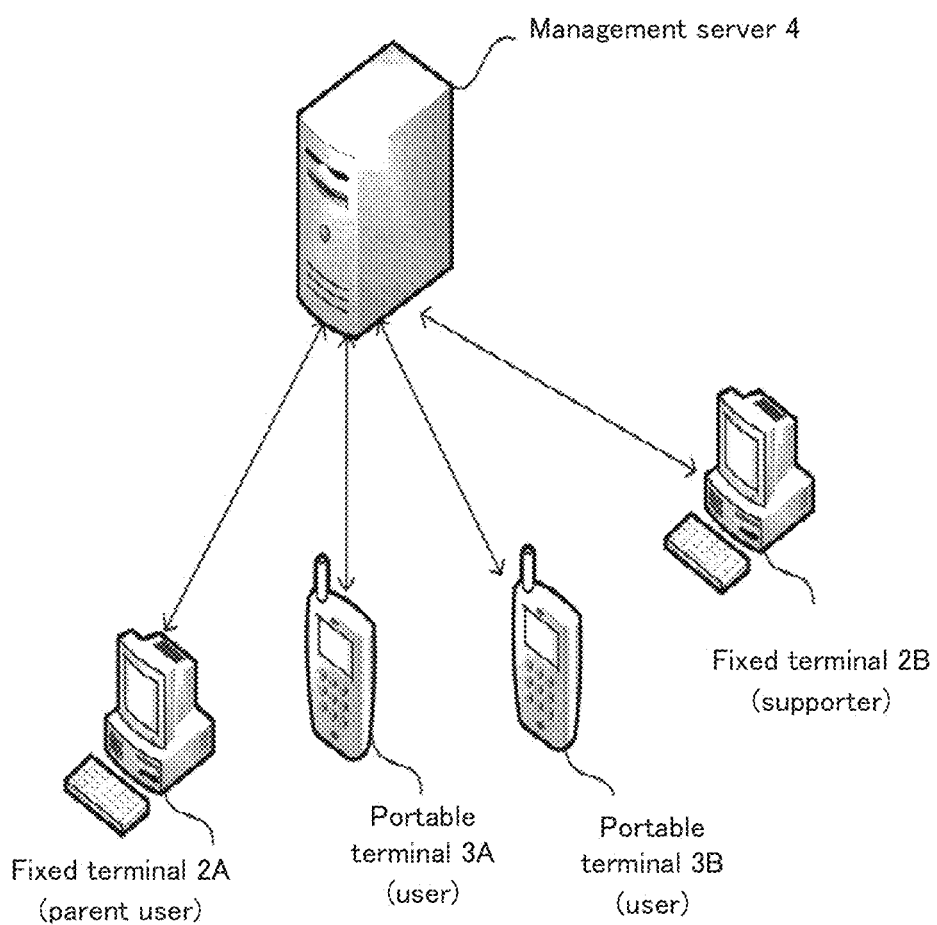
FIG. 1 is an explanatory diagram of a hardware configuration of a character hitchhike system 1.

FIG. 1 is a view showing a hardware configuration of a character hitchhike system 1.

As shown in FIG. 1, the character hitchhike system 1 includes portable terminals 3 and a management server 4. The character hitchhike system 1 in this embodiment further includes fixed terminals 2.

Each fixed terminal 2 is a stand-alone computer terminal operated by a user or a supporter. In this embodiment, a parent user and a supporter operate the fixed terminal 2. The parent user refers to the user who has an administrator right on a character. The supporter refers to a person who is not a user of the character, but is interested in the behavior of the character.

Each portable terminal 3 is a portable computer terminal operated by a user. In this embodiment, a normal user (user other than the parent user) operates his portable terminal 3 to catch and take a character to a desired place, where the character is released. Here, catch of a character means processing of associating a character with the portable terminal 3. The character associated with one portable terminal 3 (that is, the caught character) virtually moves with the movement of the associated portable terminal 3. Here, release of a character means processing of cancelling association of a character with the portable terminal 3. The character whose association with the portable terminal 3 is cancelled (that is, released character) virtually stays at the location of the portable terminal 3 when the association cancelled, and waits for being caught by the portable terminal 3.

Figure 2:
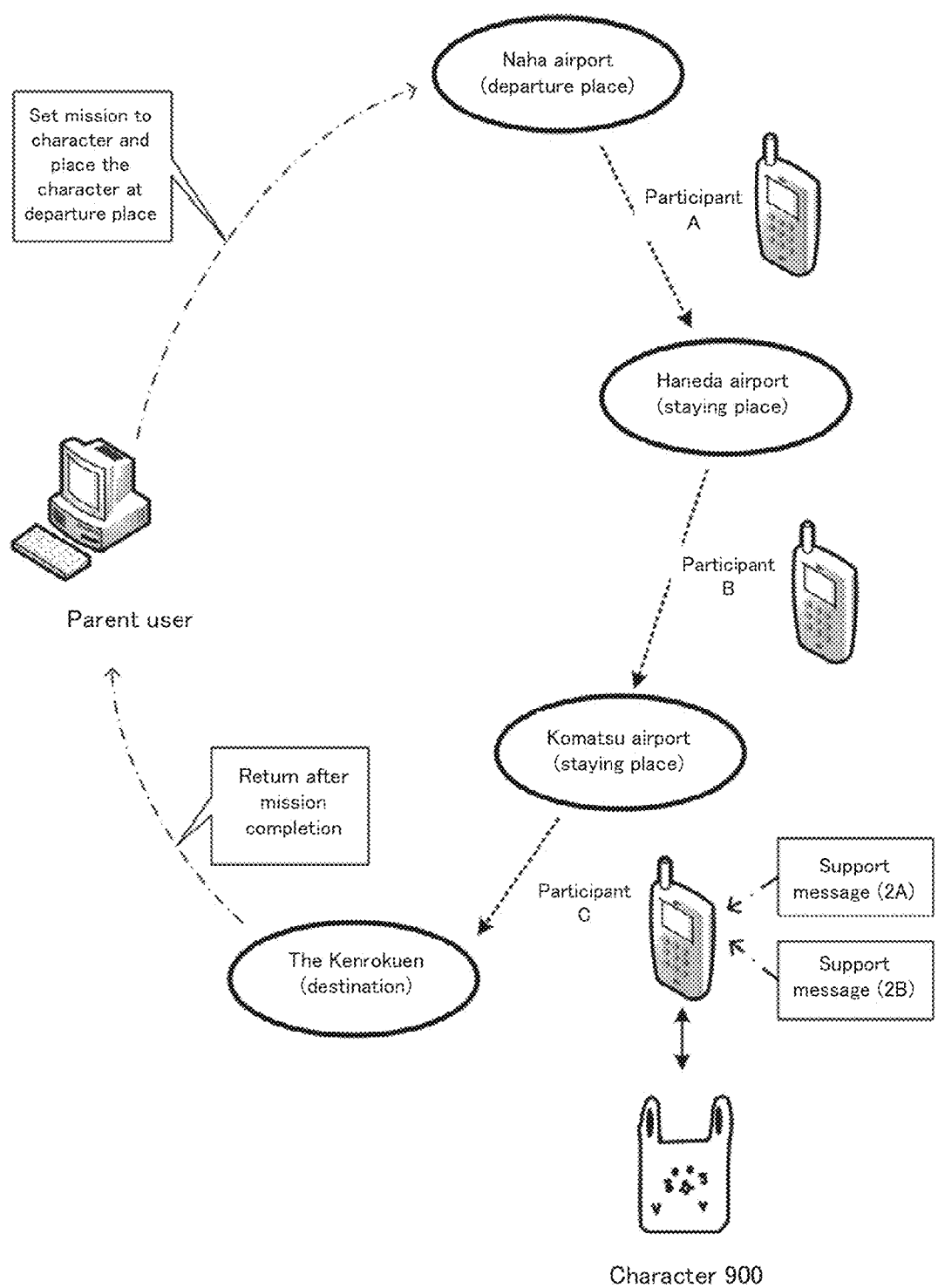
FIG. 2 is an explanatory diagram schematically showing hitchhike by a character 900 in the character hitchhike system 1.

FIG. 2 is a view schematically showing hitchhike of a character 900 in the character hitchhike system 1.

As shown in FIG. 2, in this embodiment, the parent user sets a mission (target information) to the character 900, and releases the character 900 with thus set mission at a desired departure place. The mission means a target set to the character 900, and in this embodiment, a destination on real space (Kenrokuen). The parent user may release the character at the departure place by designating coordinates in the real space, or the parent user with the portable terminal 3 may take the character to the departure place to release the character there.

When the character is released at the departure place, the released character 900 and its mission can be viewed via the portable terminal 3 near the departure place. The user views the released character 900 and its mission via his portable terminal 3, and catches the desired character 900 using his portable terminal 3. When the user who has caught the character 900 moves with his portable terminal 3, the caught character 900 also moves together. A user in this embodiment (participant A) catches the character 900 at Naha Airport, which is the departure place, and releases the character at Haneda Airport. Next, another user (participant B) catches the character 900, and releases the caught character 900 at Komatsu Airport. Finally, another user (participant C) catches the character 900 at Komatsu Airport, and takes the character 900 to the Kenrokuen as the destination. When the character 900 reaches the destination, the mission of the character 900 is completed, and the character 900 returns to the fixed terminal of the parent user.

As described above, the character hitchhike system 1 sets the mission to the character 900, thereby improving the game property in terms of the movement of the character 900 as well as gently promoting the users who catch the character 900 to move to a particular place. Thus, the number of tourists and visitors is increased.

The parent user, the supporter, or other users can send support messages to the character 900, and the users carrying the caught character 900 can view messages sent from the other users and respond to the messages.

In this manner, the character hitchhike system 1 achieves communication via the character 900.

Figure 3:
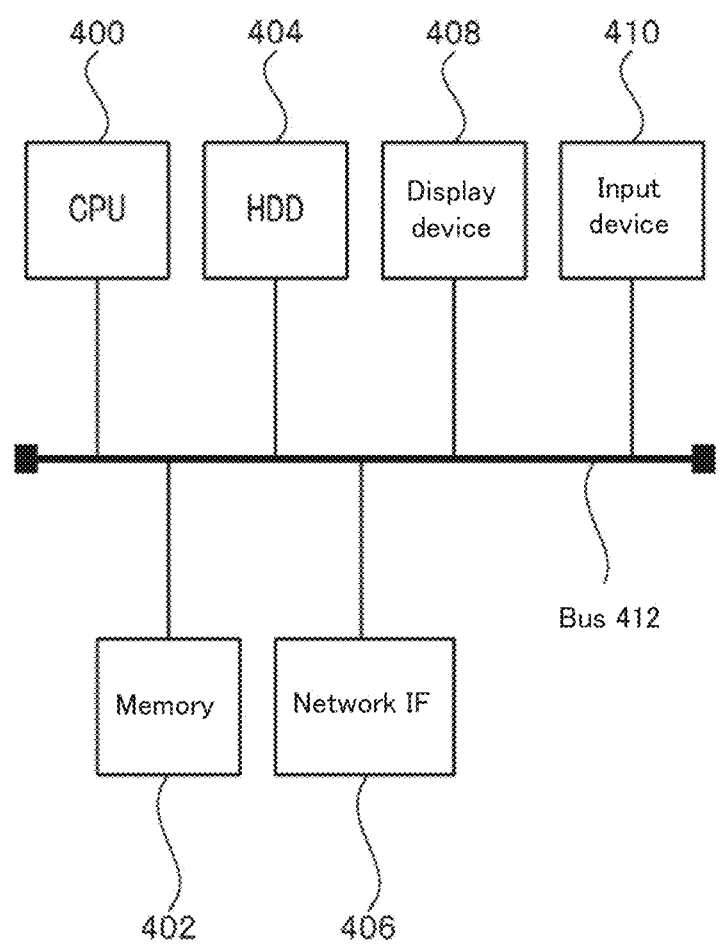
FIG. 3 is an explanatory diagram showing a hardware configuration of a management server 4.

FIG. 3 is a view showing a hardware configuration of the management server 4.

As shown in FIG. 3, the management server 4 has a CPU 400, a memory 402, an HDD 404, a network interface 406 (network IF 406), a display device 408, and an input device 410, which are interconnected via a bus 412.

The CPU 400 is a central processing unit, for example.

The memory 402 is a volatile memory, for example, which functions as a main memory.

The HDD 404 is a hard disc drive, for example, that is a nonvolatile recorder for storing a computer program and other data files therein.

The network IF 406 is an interface for wired or wireless communication, and enables communication with the fixed terminal 2 and the portable terminal 3 via the Internet.

The display device 408 is a liquid crystal display, for example.

The input device 410 is a keyboard or mouse, for example.

Figure 4:
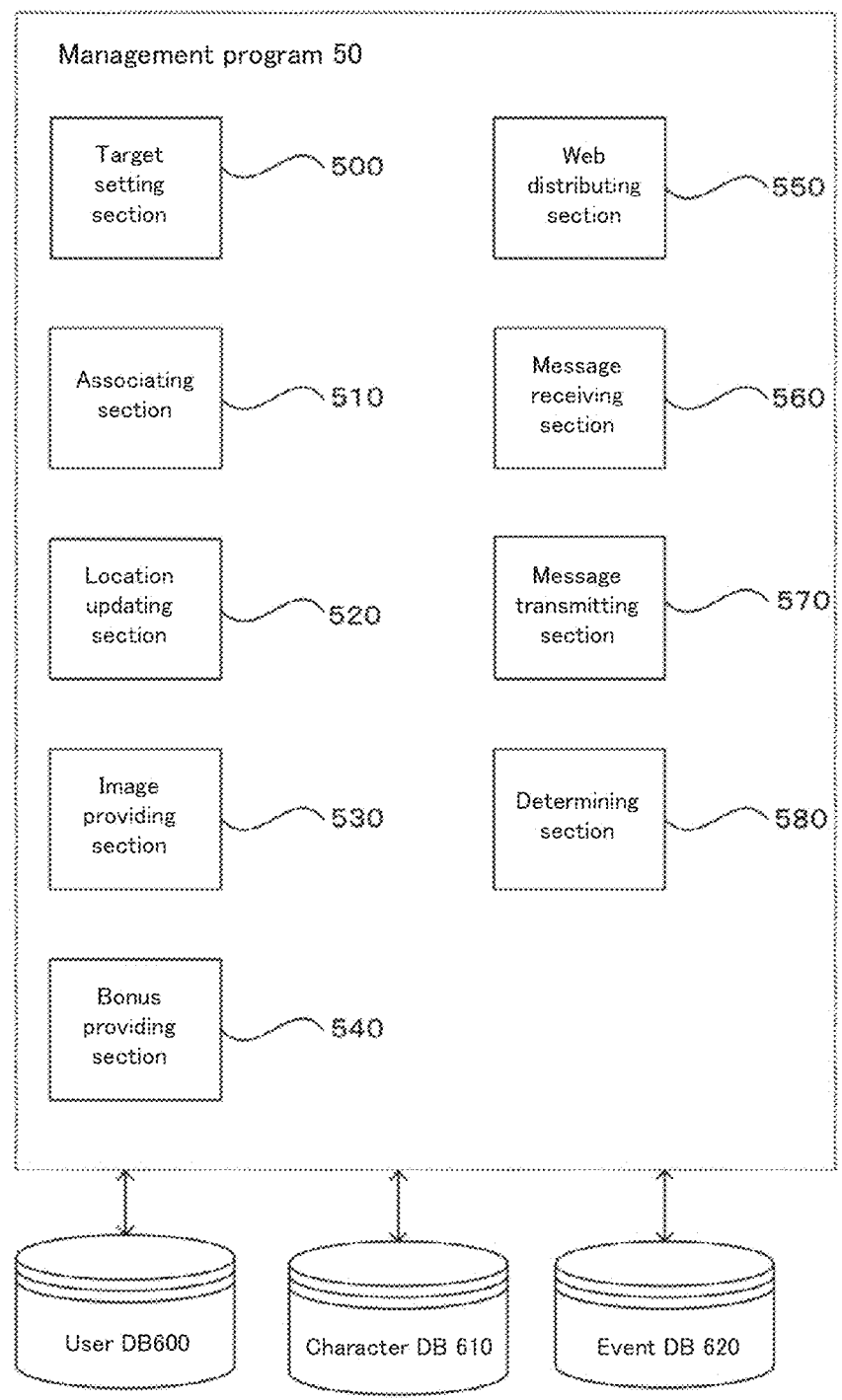
FIG. 4 is an explanatory diagram showing a functional configuration of the management server 4.

FIG. 4 is a view showing a functional configuration of the management server 4.

As shown in FIG. 4, in the management server 4 in this embodiment, a management program 50 is installed, and additionally, a user database 600 (user DB 600), a character database 610 (character DB 610), and an event database 620 (event DB 620) are constituted. These databases are merely presented as an example of a storage unit according to the present invention.

The management program 50 has a target setting section 500, an associating section 510, a location updating section 520, an image providing section 530, a bonus providing section 540, a web distributing section 550, a message receiving section 560, a message transmitting section 570, and a determining section 580.

A part or whole of the management program 50 may be implemented by hardware such as ASIC.

In the management program 50, the target setting section 500 sets target information to the character 900 according to an instruction from a user. In this embodiment, in response to an instruction from the parent user, the target setting section 500 sets a destination to the character 900, as the mission.

In the case where the character 900 is not associated with any portable terminal 3, the associating section 510 associates the portable terminal 3 with the character 900 in response to an instruction from a user and based on location information of the character 900 and location information of the portable terminal 3 at the present time. In this embodiment, when the catch operation is made by use of a user's portable terminal 3, the associating section 510 associates the character 900 with the user's portable terminal 3 on the condition that the character 900 is not associated with any portable terminal 3 and that the user's portable terminal 3 is present in a predetermined range from the current location of the character 900.

When the associating section 510 associates the character 900 with the portable terminal 3, the location updating section 520 updates the location information of the character 900 based on the location information of the associated portable terminal 3. The location updating section 520 in this embodiment receives the location information (GPS (Global Positioning System) data) of the portable terminal 3 from the portable terminal 3 that has caught the character 900 at predetermined intervals, and updates the location information of the character 900 based on the received location information.

Figure 15:
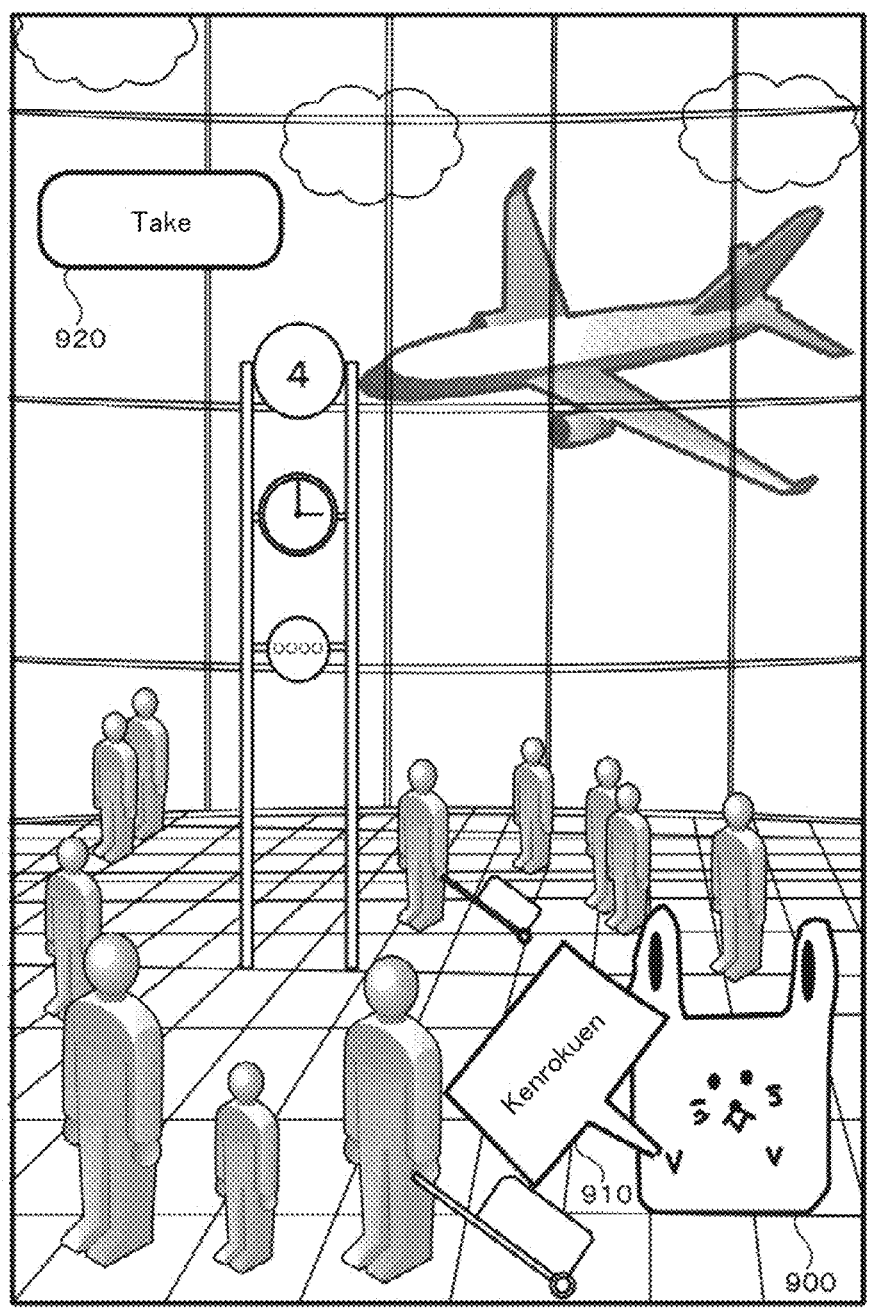
FIG. 15 is an example of a displayed image when catching a character.
Figure 16:
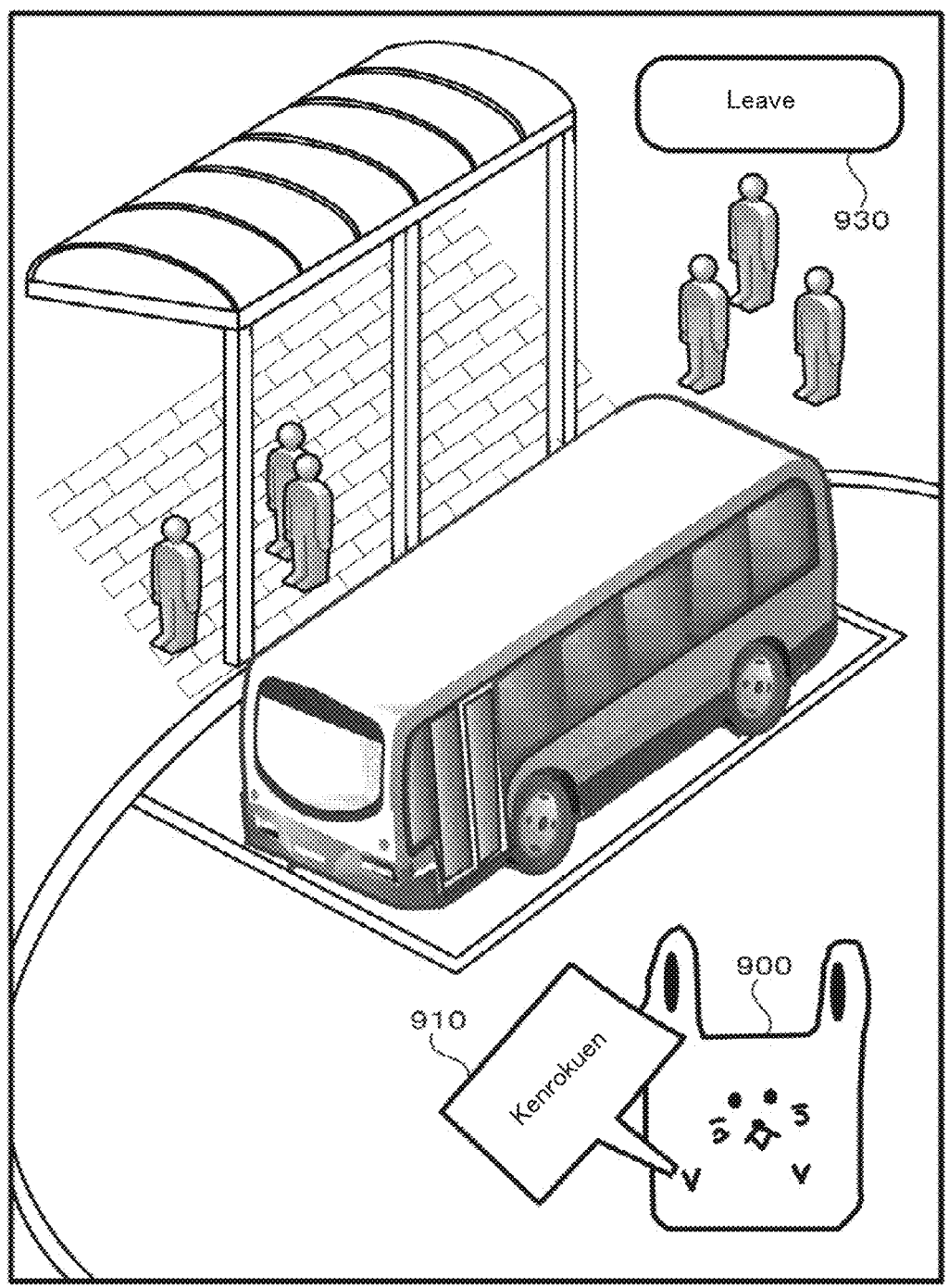
FIG. 16 is one example of a displayed image when releasing a character.
Figure 17:
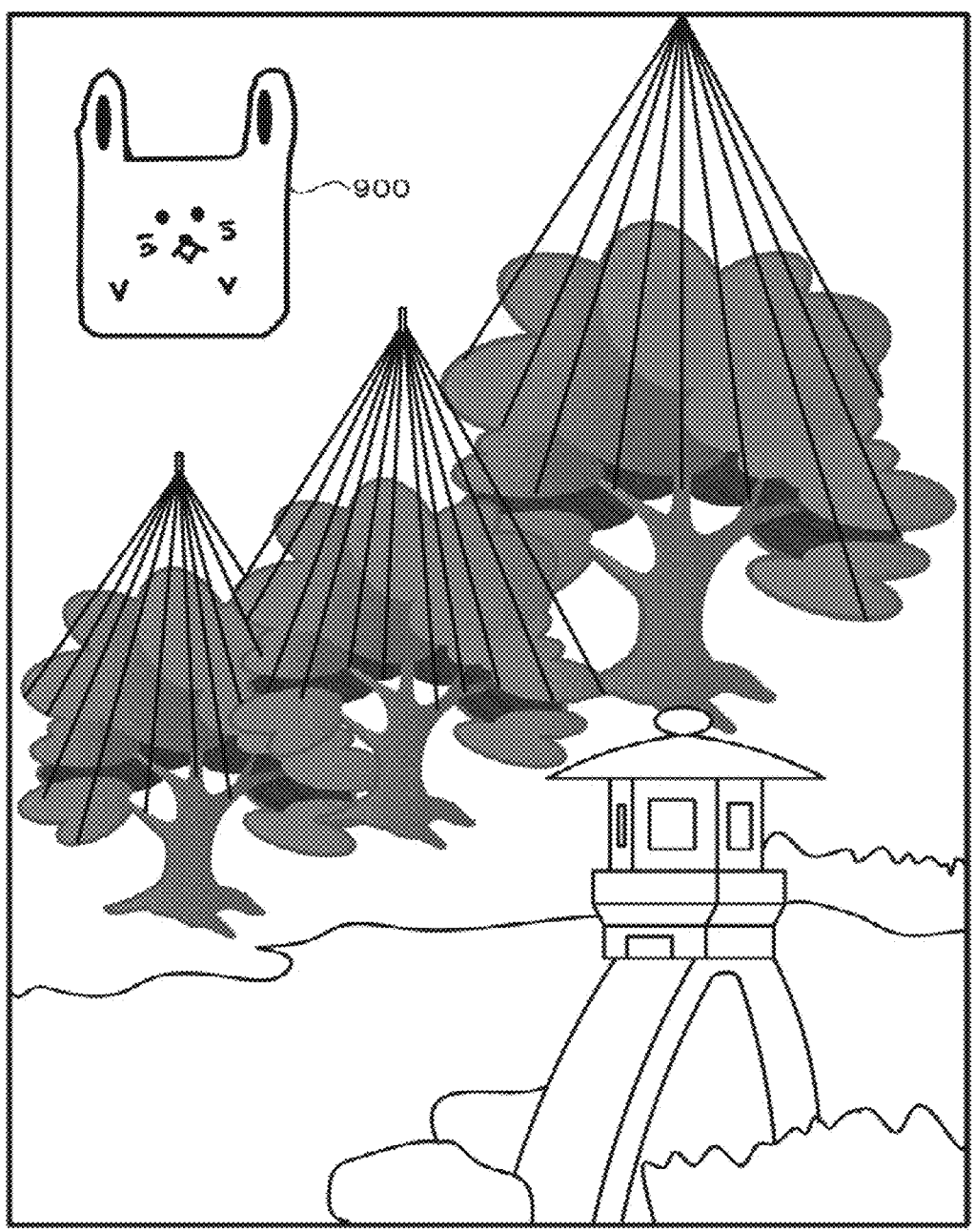
FIG. 17 is one example of an extended real photo at completion of a mission of the character.

The image providing section 530 provides a character image containing the character 900 and a target image 910 suggesting the target of the character 900 to the portable terminal 3. That is, in the case where a composite image is generated by combining an image captured by the portable terminal and the character image, the image providing section 530 provides the character image that varies according to the target information associated with the character. As shown in FIG. 15 to FIG. 17, for the case where the user views the staying character 900 or where an extended real photo containing the caught character 900 is taken, the image providing section 530 in this embodiment provides the character image containing the character 900 and the target image 910 to the portable terminal 3.

In response to a request from the viewer (user), the bonus providing section 540 provides a bonus to the portable terminal 3 associated with the character 900. The viewer refers to a person who views the behavior (location information and the like) of the character 900 via web distribution, and may include the parent user and other users. The bonus is, for example, points that can be exchanged with an object or service, which is useful for the offered person. For example, when the mission of the character 900 is completed or a request is made from the viewer, the bonus providing section 540 provides the bonus to the portable terminal 3 that catches the character 900. The bonus providing section 540 in this embodiment provides points as the bonus.

The web distributing section 550 distributes information on the character 900 (for example, the current location of the character) to the viewer. The web distributing section 550 in this embodiment publishes web contents containing the mission of the character 900, extended real photos that have been taken, the travelling route that has been taken, and the current location of the character 900, on a web site.

The message receiving section 560 receives a message for the character 900. For example, the message receiving section 560 receives messages for the character 900 from the parent user of the character 900 and users who catch the common character 900.

The message transmitting section 570 transmits the received message for a certain character 900 to the portable terminal 3 associated with the character. When the message receiving section 560 receives the message for the character 900, or an event (completion of the mission, taking of an extended real photo, or the like) on the character 900 occurs, the message transmitting section 570 in this embodiment transmits the received message or notification of the event that has occurred to a plurality of users associated with the common character 900.

Based on the location information of the character 900 and the target information set to the character 900, the determining section 580 determines whether or not the target of each character is attained. The determining section 580 in this embodiment determines whether or not the current location of the character 900 falls within a range of destination based on the location information of the character 900 and the destination of the character 900, but the present invention is not limited to this. For example, when the character 900 is set as the mission to pass through a predetermined check point, move by a predetermined distance, or move at a predetermined speed, the determining section 580 may determine whether or not the character 900 has passed through the predetermined check point, has moved by the predetermined distance, or has moved at the predetermined speed, based on the location information of the character 900.

The user DB 600 is a database that stores information on users, and more specifically, stores a user management table and a block table as below-mentioned.

The character DB 610 is a database that stores information on a character, and more specifically, stores a character master, a character management table and a mission table, as below-mentioned.

The event DB 620 is a database that stores information on events occurring for a character, and more specifically, stores an event table and a message table as below-mentioned.

Figure 5:
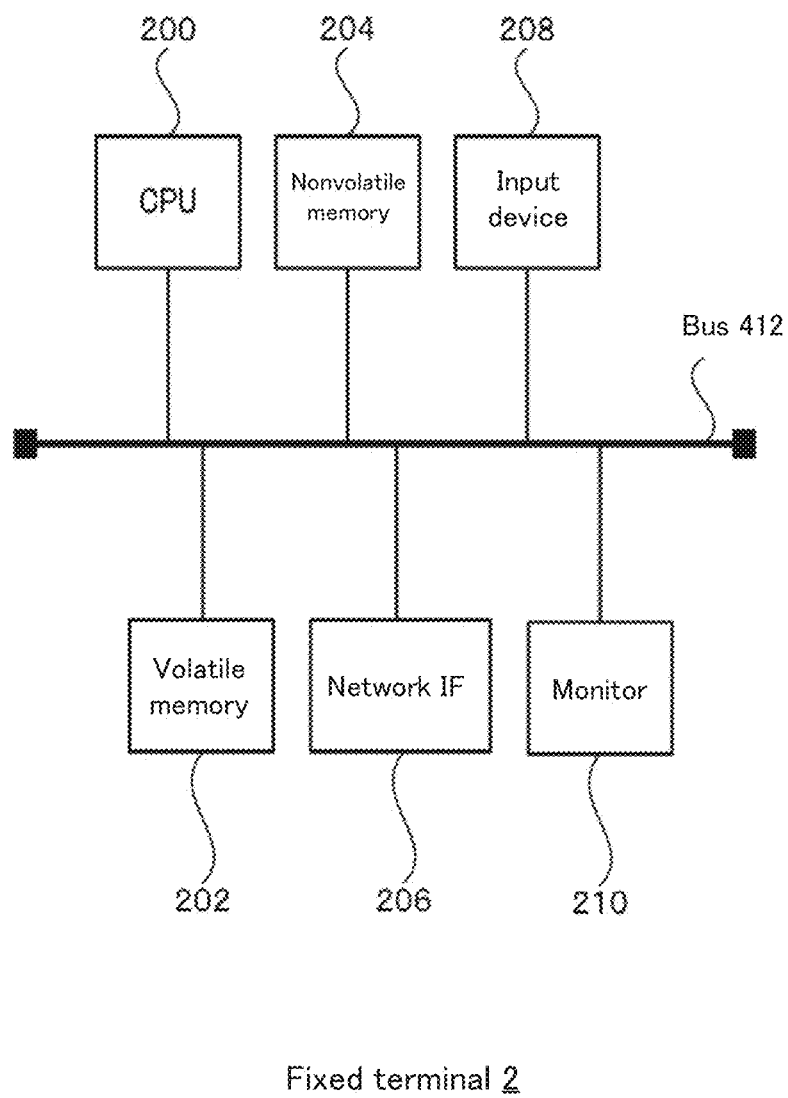
FIG. 5 is an explanatory diagram showing a hardware configuration of a fixed terminal 2.

FIG. 5 is a view showing a hardware configuration of the fixed terminal 2.

As shown in FIG. 5, the fixed terminal 2 has a CPU 200, a volatile memory 202, a nonvolatile memory 204, a network interface 206 (network IF 206), an input device 208, and a monitor 210, which are interconnected via a bus 212.

The CPU 200 is a central processing unit, for example.

The volatile memory 202 functions as a main memory, for example.

The nonvolatile memory 204 is a nonvolatile recorder, for example, which stores a computer program and other data files.

The network IF 206 is an interface for wired or wireless communication, which enables communication with the management server 4 via the Internet.

The input device 208 is a keyboard or mouse, for example, which receives an input of the parent user.

The monitor 210 is a liquid crystal display, for example.

Figure 6:
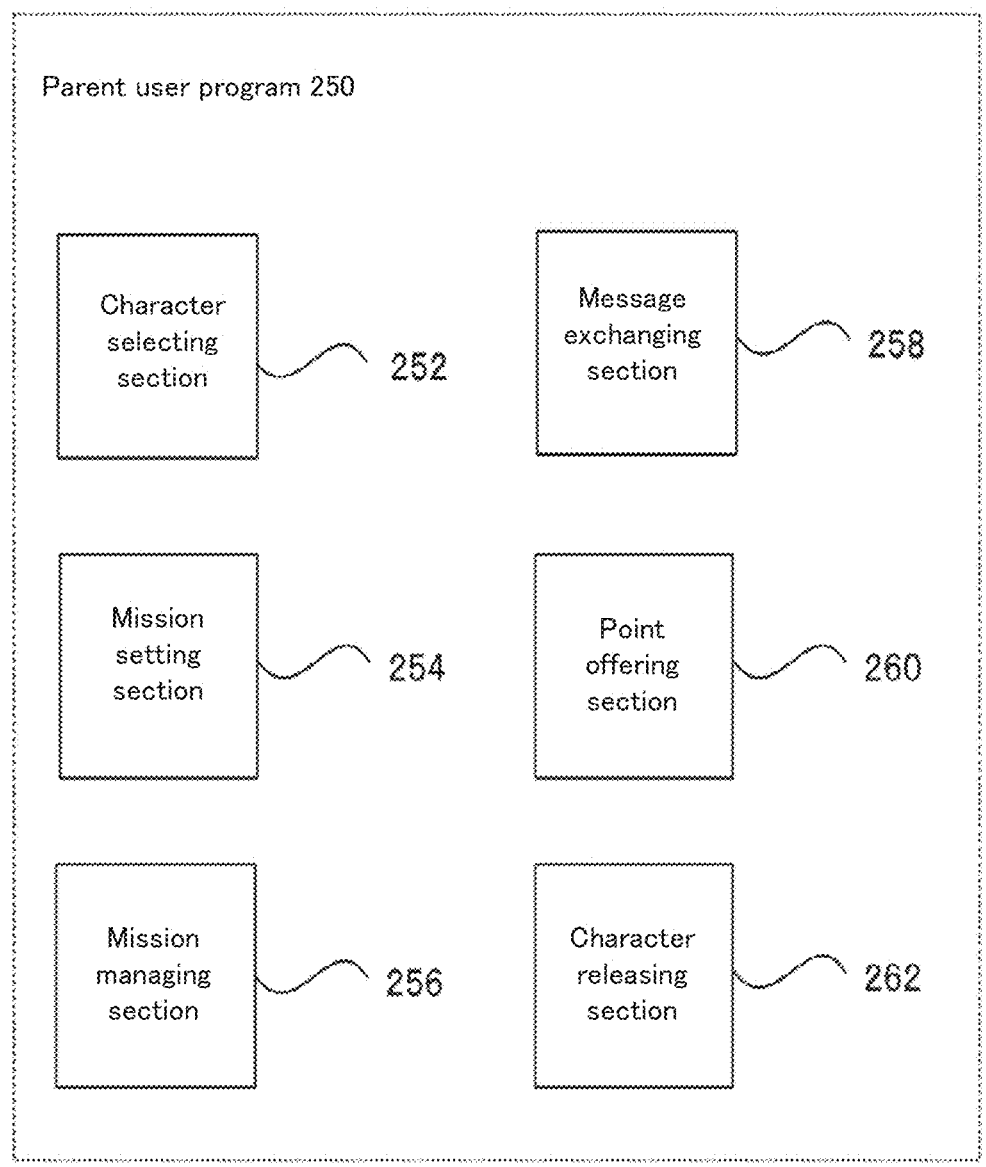
FIG. 6 is an explanatory diagram showing a functional configuration of the fixed terminal 2 of a parent user.

FIG. 6 is a view showing a functional configuration of the fixed terminal 2 of the parent user.

As shown in FIG. 6, a parent user program 250 is installed in the fixed terminal 2. The parent user program 250 has a character selecting section 252, a mission setting section 254, a mission managing section 256, a message exchanging section 258, a point offering section 260, and a character releasing section 262. A part or whole of the program may be implemented by hardware such as ASIC, or may be implemented by adopting a part of functions of the OS (Operating System).

In the parent user program 250, the character selecting section 252 selects a desired character from the characters 900 managed by the management server 4.

In response to an instruction from the parent user, the mission setting section 254 sets a mission to the character selected by the character selecting section 252. Specifically, the mission setting section 254 instructs the target setting section 500 of the management server 4 to set a mission.

In response to an instruction from the parent user, the mission managing section 256 executes confirmation of completion, interruption, recovery and the like with respect to the mission.

In response to an instruction from the parent user, the message exchanging section 258 exchanges messages via the character 900. Specifically, the message exchanging section 258 transmits a message to the message receiving section 560 of the management server 4, and receives a message from the message transmitting section 570 of the management server 4.

In response to an instruction from the parent user, the point offering section 260 offers points to the portable terminal 3 associated with the character 900. Specifically, the point offering section 260 instructs the bonus providing section 540 of the management server 4 to provide points to the user who has caught the character 900.

In response to an instruction from the parent user, the character releasing section 262 causes the character 900 whose mission is set by the mission setting section 254 to stay at a designated place (that is, the departure place).

Figure 7:
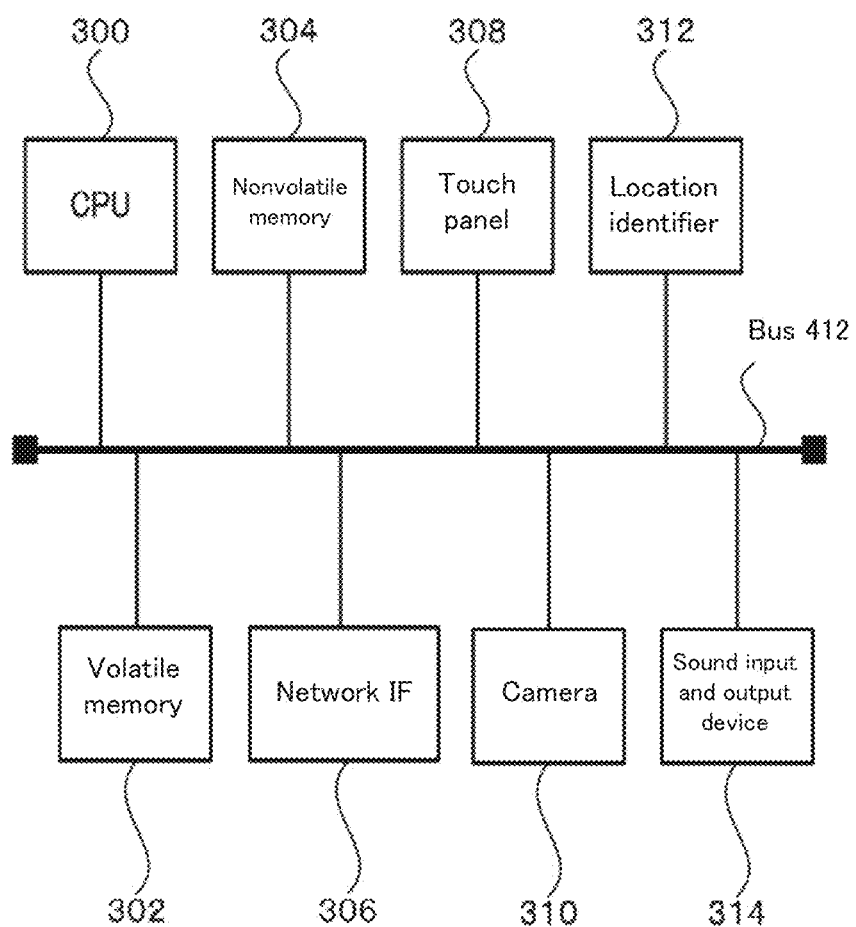
FIG. 7 is an explanatory diagram showing a hardware configuration of a portable terminal 3.

FIG. 7 is a view showing a hardware configuration of the portable terminal 3.

As shown in FIG. 7, the portable terminal 3 has a CPU 300, a volatile memory 302, a nonvolatile memory 304, a network interface 306 (network IF 306), a touch panel 308, a camera 310, a location identifier 312, and a sound input and output device 314, which are interconnected via a bus 316.

The CPU 300 is a central processing unit, for example.

The volatile memory 302 functions as a main memory, for example.

The nonvolatile memory 304 is a nonvolatile recorder, for example, which stores a computer program and other data files.

The network IF 306 is an interface for wireless communication, which enables communication with the management server 4 via telephone channel or the Internet.

The touch panel 308 is a display that functions as a display device and an input device, for example.

The camera 310 is a photographing device incorporated in the portable terminal 3, for example. The camera 310 may be a photographing device externally connected by use of a USB cable or the like.

The location identifier 312 is a device that receives a GPS signal and identifies the current location based on the received signal, for example.

The sound input and output device 314 is a mike or speaker, for example, which enables inputting and outputting of sound.

Figure 8:
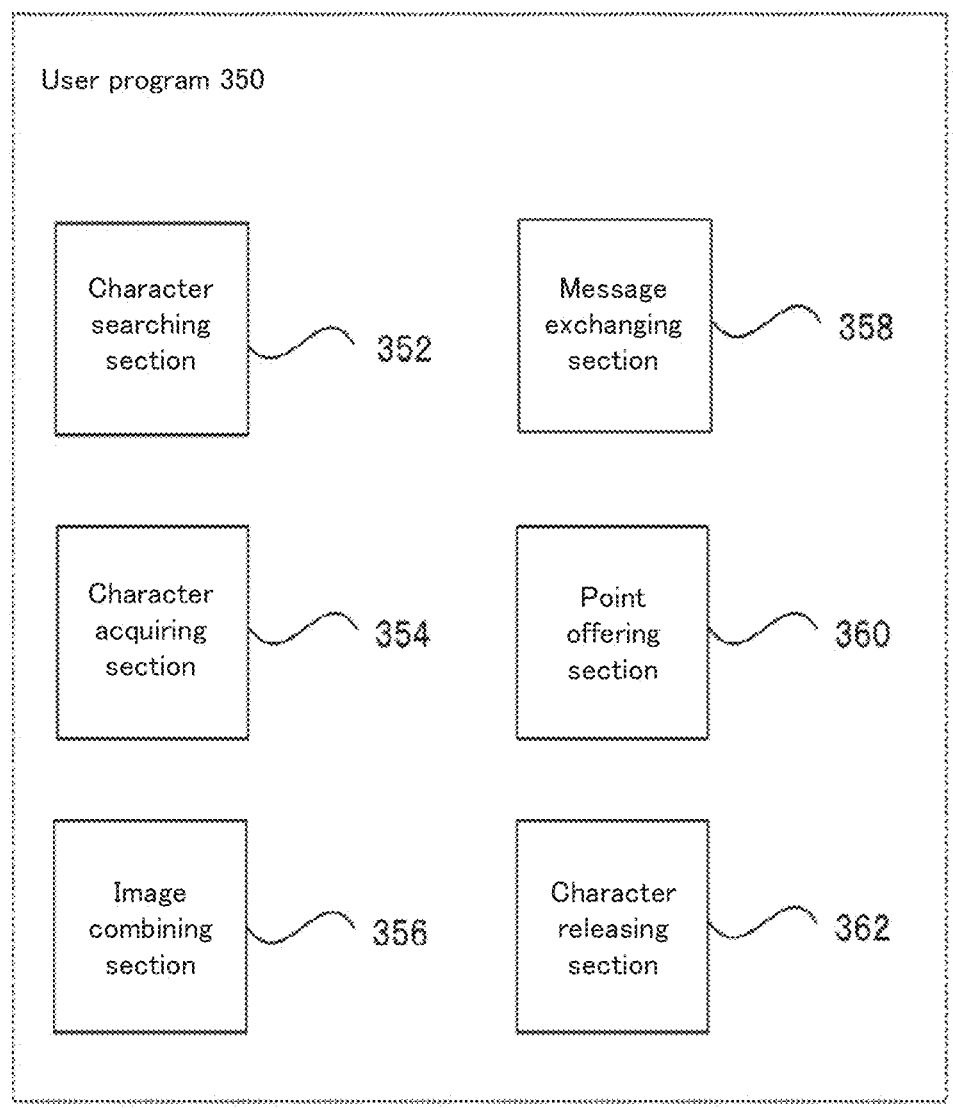
FIG. 8 is an explanatory diagram showing a functional configuration of the portable terminal 3.

FIG. 8 is a view showing a functional configuration of the portable terminal 3.

As shown in FIG. 8, a user program 350 is installed in the portable terminal 3. The user program 350 has a character searching section 352, a character acquiring section 354, an image combining section 356, a message exchanging section 358, a point offering section 360, and a character releasing section 362. A part or whole of the program may be implemented by hardware such as ASIC, or may be implemented by adopting apart of functions of the OS (Operating System).

In the user program 350, the character searching section 352 searches a staying character 900. The character searching section 352 in this embodiment controls the location identifier 312 to identify the location of the staying portable terminal 3, acquire image data of the character 900 staying at the identified location from the management server 4, combine the acquired image data of the character 900 with an image taken by the camera 310, and display thus combined image on the touch panel 308.

In response to an instruction from the user, the character acquiring section 354 catches the staying character 900. Specifically, when detecting the user's catch operation, the character acquiring section 354 requests the associating section 510 to associate the portable terminal 3 with the character 900.

The image combining section 356 combines the image taken by the camera 310 with the character image of the caught character 900, and uploads thus combined image to the management server 4.

In response to an instruction from the user, the message exchanging section 358 exchanges messages via the character 900. Specifically, the message exchanging section 358 transmits a message to the message receiving section 560 of the management server 4, and receives a message from the message transmitting section 570 of the management server 4.

In response to an instruction from the user, the point offering section 360 offers points to the portable terminal 3 associated with the character 900. Specifically, the point offering section 360 instructs the bonus providing section 540 of the management server 4 to allot some owned points to users who has caught the character 900.

In response to an instruction from the user, the character releasing section 362 releases the associated character 900. Specifically, when detecting the user's release operation, the character releasing section 362 requests the associating section 510 to cancel association of the portable terminal 3 with the character 900.

Figure 9:
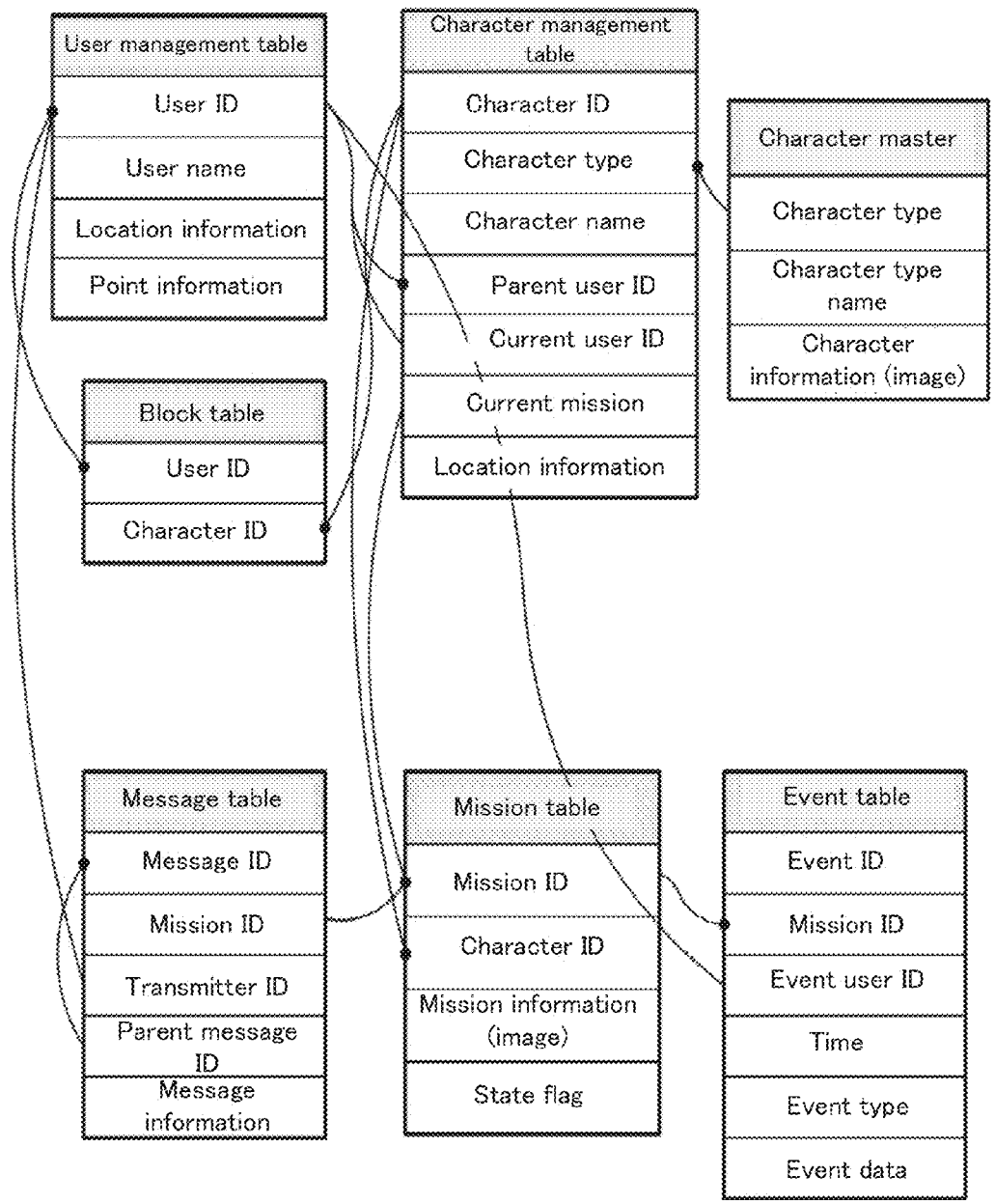
FIG. 9 is an explanatory diagram showing a data structure of data managed by the management server 4.

FIG. 9 is a view showing a data structure of data managed by the management server 4.

As shown in FIG. 9, the management server 4 associates a user ID for identifying a user, user name, user location information, and point information with one another for each user, and stores them in the form of a user management table in the user DB 600. The user location information is, for example, the location information of the portable terminal 3 held by the user. The point information is an example of the bonus offered to the user's portable terminal 3, specifically, the number of points.

The management server 4 associates the user ID with a character ID with one another, and stores the association in the form of a block table in the user DB 600. The combination of the user ID and the character ID, which is registered in the block table, is information for identifying an object (user) who is blocked from being notified, and on the like.

The management server 4 associates a character ID for identifying a character, a character type representing a type of the character, a character name representing a name of the character, a parent user ID for identifying a parent user of the character, a current user ID as the user ID of the user who currently carries the character, a current mission representing a current mission of the character, and location information representing current location of the character, with one another for each character, and stores them in the form of a character management table in the character DB 610.

The management server 4 associates a character type, a character type name, and character information with one another, and stores them as a character master in the character DB 610. The character information includes an image data of the character 900.

The management server 4 associates a mission ID for identifying a mission, a character ID of a character to which the mission is set, a mission image specifying or suggesting the content of the mission, and a state flag representing the state of the character with respect to the mission, with one another, and stores them in the form of a mission table in the character DB 610.

The management server 4 associates an event ID for identifying an event for a character, a mission ID of a mission set to the character, an event user ID as a user ID of the user who has caused the event, a time representing data and time at the occurrence of the event, an event type representing a type of the event, and event data as a data file generated for the event, with one another, and stores them in the form of an event table in the event DB 620. Examples of the event type include a release event that the character is released, a catch event that the character is caught, a photograph event that an extended real photo is taken, and a completion event that the mission is completed. Examples of the event data include image data of an extended real photo using the character.

The management server 4 associates a message ID for identifying a message, a mission ID of a character as the center of the message, a transmitter ID for identifying a transmitter of the message, a parent message ID as a message ID of a parent message of the message, and message information as the content of the message, with one another, and stores them in the form of a message table in the event DB 620.

Next, the operation of the character hitchhike system 1 will be described.

Figure 10:
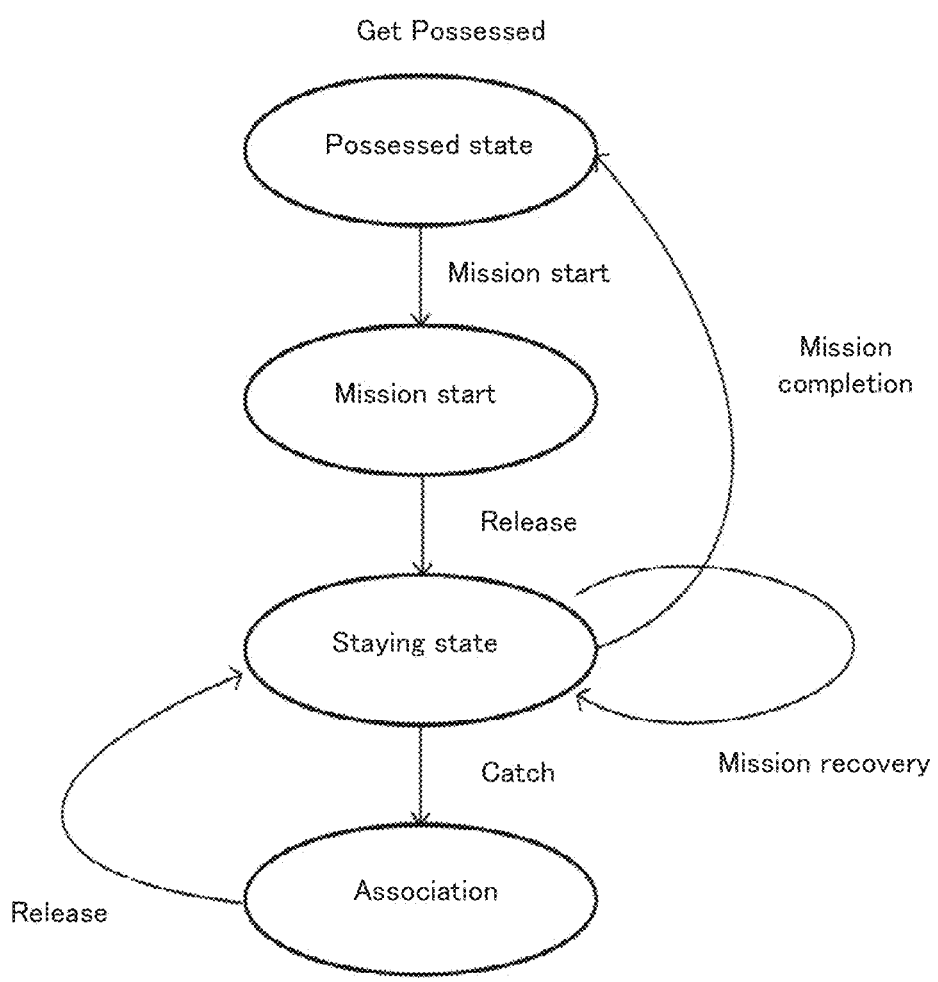
FIG. 10 is an explanatory diagram showing transition of the state of a character.

FIG. 10 is a view showing transition of the state of the character.

As shown in FIG. 10, when a parent user sets a mission in the state where the fixed terminal 2 of the parent user possesses the character 900 (possessed state), the character 900 transitions to a mission start state.

When the parent user releases the character 900 in the mission start state at a desired place, the character 900 transitions to a staying state and waits at the released place.

When a user catches the character 900 in the staying state, the caught character 900 is put into an associated state, and moves along with the movement of the user. In this embodiment, as shown in FIG. 15, the character 900 in the staying state is displayed by an extended real photo on the portable terminal 3, whereby found by the user. When found, by the user pressing a catch button 920 for instruction of catch, the character 900 is associated with the user (that is, caught by the user).

When the user releases the associated character 900 at a desired place, the released character 900 returns to the staying state and waits at the released place. In this embodiment, as shown in FIG. 16, by the user pressing a release button 930 for instruction of release, the character 900 is put into the staying state at the place.

When the parent user executes mission recovery as mentioned blow, the character 900 is returned to the last staying place and into the staying state.

After completion of the mission, the character 900 returns to the fixed terminal 2 of the parent user, and is put into the possessed state.

Figure 11:
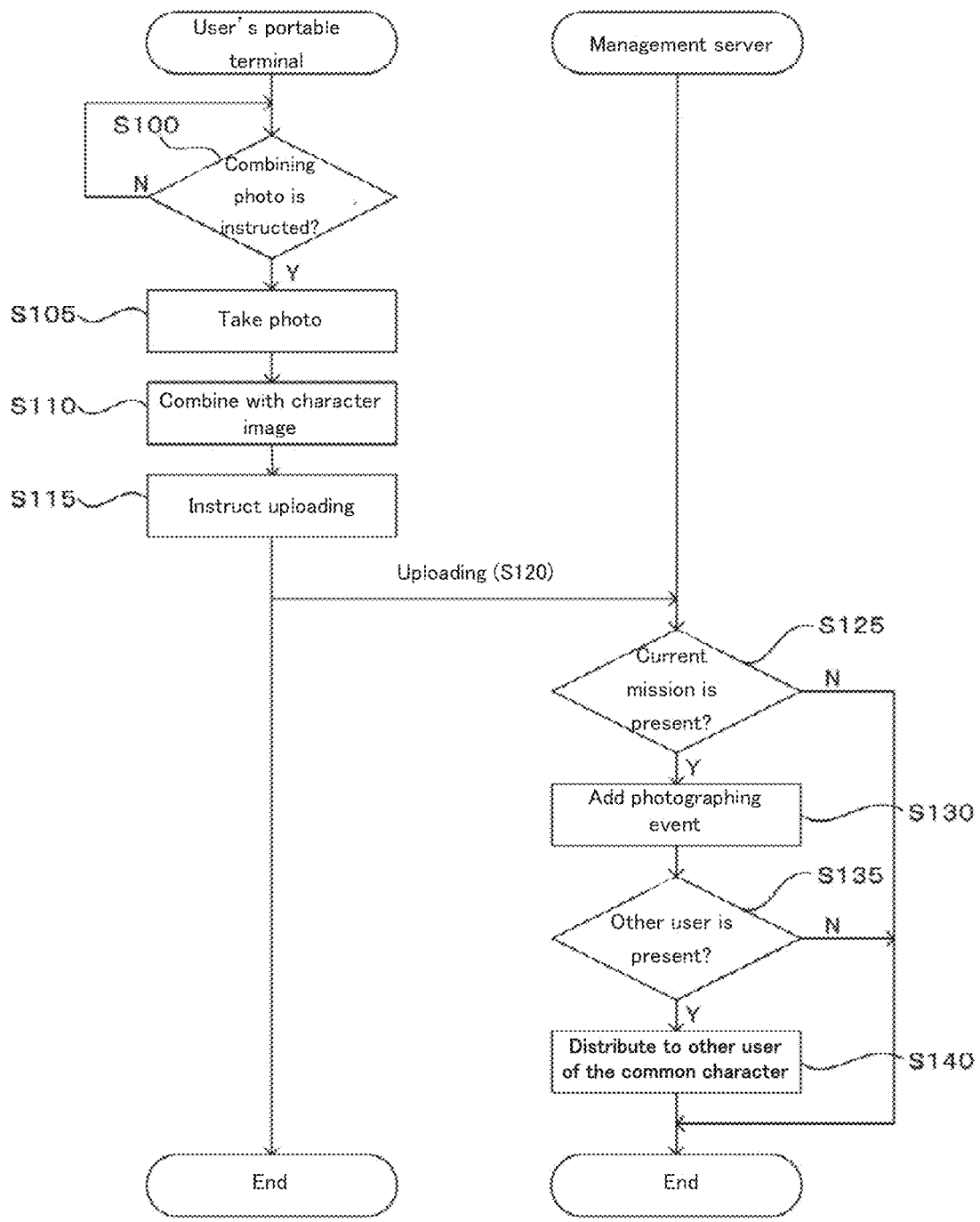
FIG. 11 is a flow chart of extended real photo generating processing (S10)

FIG. 11 is a flowchart of extended real photo generating processing (S10).

As shown in FIG. 11, in Step 100 (S100), the image combining section 356 of the portable terminal 3 waits for user's instruction to perform photo combining (S100: No), and when photo combining is instructed, the procedure transitions to processing in S105 (S100: Yes).

In Step 105 (S105), the image combining section 356 controls the camera 310 of the portable terminal 3 to take a photo on real space.

In Step 110 (S110), the image combining section 356 combines a character image of the character 900, which is previously supplied by the management server 4 (image providing section 530), with a photographed image taken by the camera 310.

In Step 115 (S115), when detecting an upload instruction from the user, the image combining section 356 starts to upload the combined image.

In Step 120 (S120), the portable terminal 3 transmits the user ID of the user, the mission ID, and photographing date and time together with image data of the combined image to the management server 4.

In Step 125 (S125), based on the combined image, the user ID, and the mission ID, which are received from the portable terminal 3, the web distributing section 550 of the management server 4 determines whether or not the current mission is present.

The management server 4 transitions to processing in S130 when the current mission is present (S125: Yes), and finishes processing when not present (S125: No).

In Step 130 (S130), based on the information received from the portable terminal 3, the web distributing section 550 adds a photographing event to the event table.

In Step 135 (S135), referring to the character management table, the web distributing section 550 determines whether or not other users associated with the common character and mission are present, and transitions to processing in S140 when the associated other users (including the parent user) are present (S135: Yes), and finishes processing when not present (S135: No).

In Step 140 (S140), the web distributing section 550 distributes the image data of the received combined image to the fixed terminal 2 or the portable terminals 3 of other users associated with the common character and mission. However, referring to the block table, the web distributing section 550 does not distribute the image data to the user who is blocked from being distributed.

As described above, in the character hitchhike system 1, the user associated with the character 900 can take an extended real photo combined with the character image, and share the taken extended real photo with the parent user and other users who have been associated with the common character 900 in the past. Thus, a community is formed centering on the character 900, and for example, even the user who has released the character 900 can continue to be interested in the behavior of the character.

Figure 12:
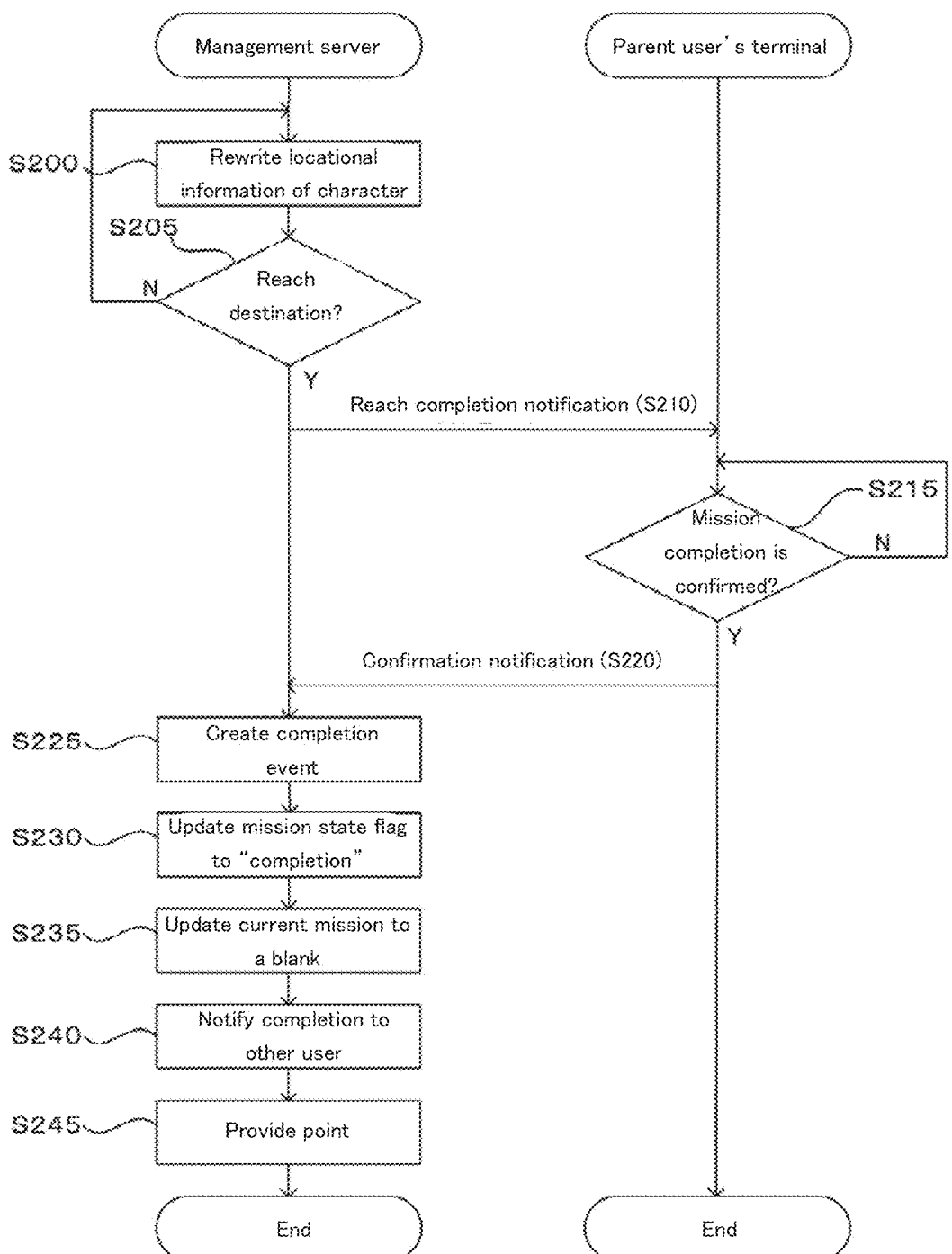
FIG. 12 is a flow chart of completion determining processing (S20)

FIG. 12 is a flow chart of completion determining processing (S20).

As shown in FIG. 12, in Step 200 (S200), when receiving location information from the portable terminal 3 associated with the character 900, the location updating section 520 of the management server 4 rewrites location information (location information in the character management table) of the character 900 based on the received location information.

In Step 205 (S205), the determining section 580 determines whether or not the character 900 has reached the destination based on the location information rewritten by the location updating section 520 and the destination set to the character 900 (information in the mission table).

The management server 4 transitions to processing in S210 when it is determined that the character 900 has reached the destination (S205: Yes), and returns to the processing in S200 when determined that the character 900 has not reached the destination (S205: No).

In Step 210 (S210), the determining section 580 of the management server 4 notifies the parent user of the character 900 that the character 900 has reached the destination.

The parent user determines whether or not the mission of the character 900 has been completed, for example, by viewing the extended real photo uploaded by the current user of the character 900 (shown in FIG. 17).

In Step 215 (S215), the mission managing section 256 of the fixed terminal 2 waits for an operation of confirming mission completion (S215: No), and transitions to processing in S220 after the operation of confirming mission completion by the parent user (S215: Yes).

In Step 220 (S220), the mission managing section 256 notifies the mission completion to the determining section 580 of the management server 4.

The point offering section 260 instructs the bonus providing section 540 of the management server 4 to provide points to the current user.

In Step 225 (S225), when receiving notification of mission completion, the determining section 580 creates a completion event of the mission and registers the event in the event table.

In Step 230 (S230), the determining section 580 updates the state flag of the mission table to "completion".

In Step 235 (S235), the determining section 580 updates the current mission in the character management table to a blank. Through the above-mentioned processing, the character 900 is initialized and returns to the parent user.

In Step 240 (S240), the web distributing section 550 distributes the fact that the mission has been completed to the other users related to the completed mission (users associated with the character). This distribution includes, for example, the extended real photo taken at the destination.

In Step 245 (S245), in response to an instruction from the point offering section 260, the bonus providing section 540 provides points to the current user. The bonus providing section 540 may distribute the points designated by the parent user to all users related to the mission.

As described above, in the character hitchhike system 1, when the mission of the character 900 is completed, all related persons (users) can receive notification of mission completion and share the joy of mission completion. At this time, the message (message for the character) transmitted from the message exchanging section 258 of the fixed terminal 2 or the message exchanging section 358 of the portable terminal 3 is shared by the related persons via the message receiving section 560 and the message transmitting section 570 of the management server 4.

Figure 13:
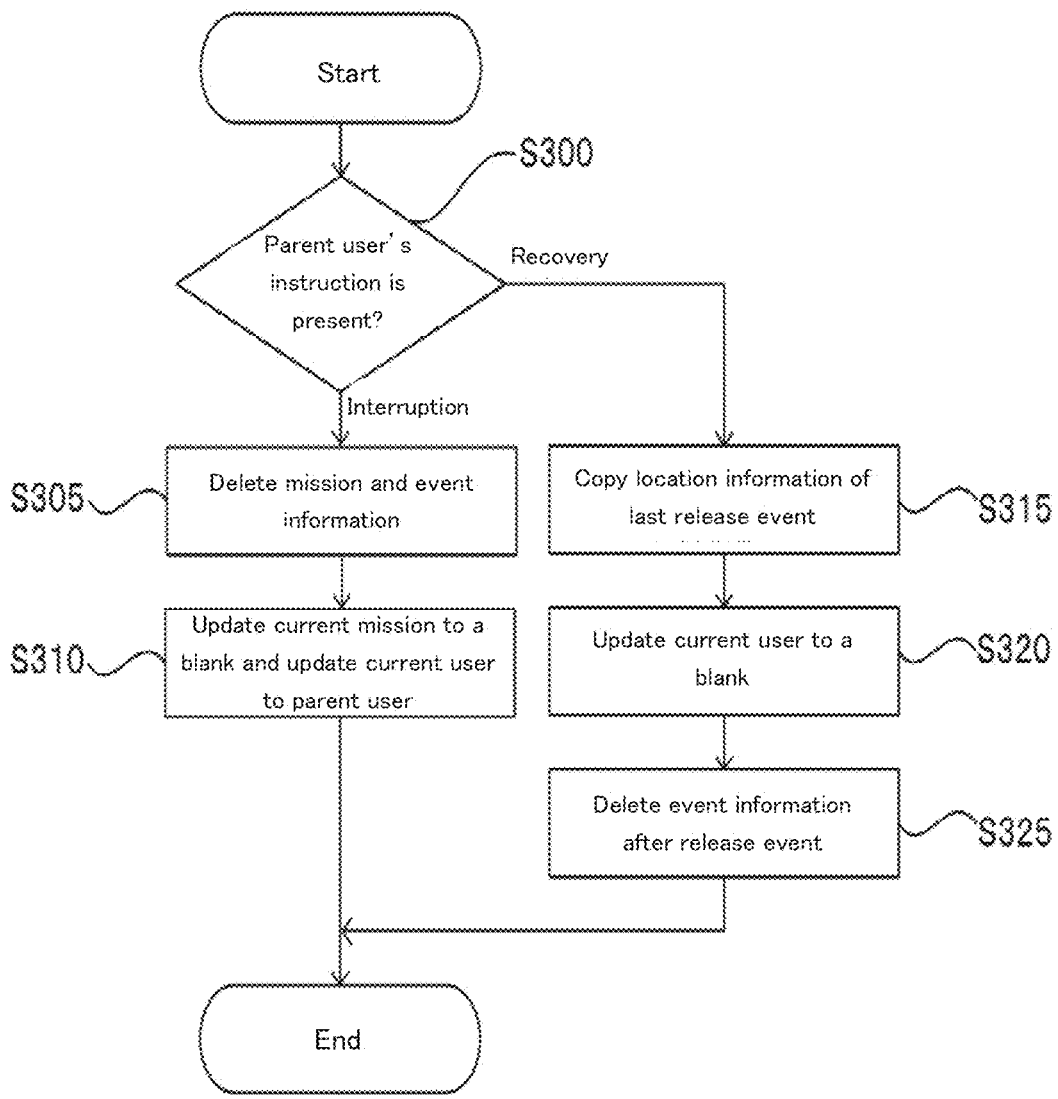
FIG. 13 is a flow chart of interruption/recovery processing (S30)

FIG. 13 is a flow chart of interruption/recovery processing (S30).

As shown in FIG. 13, in Step 300 (S300), the mission managing section 256 of the fixed terminal 2 transitions to processing in S305 when the parent user performs a mission interruption operation (S300: interruption), and transitions to processing in S315 when the parent user performs a mission recovery operation (S300: recovery).

In Step 305 (S305), the mission managing section 256 deletes information registered in the mission table and information registered in the event table for a designated mission.

In Step 310 (S310), the mission managing section 256 updates the current mission in the character management table to a blank for the character of the designated mission, and updates the current user into the parent user. Thereby, the character 900 returns to the parent user.

In Step 315 (S315), referring to the event table for the designated mission, the mission managing section 256 copies location information of the last release event on location information in the character management table.

In Step 320 (S320), for the character of the designated mission, the mission managing section 256 updates the current user in the character management table to a blank.

In Step 325 (S325), referring to the event table for the designated mission, the mission managing section 256 deletes information after the last release event.

As described above, the parent user can perform mission interruption and mission recovery (reverse).

Figure 14:
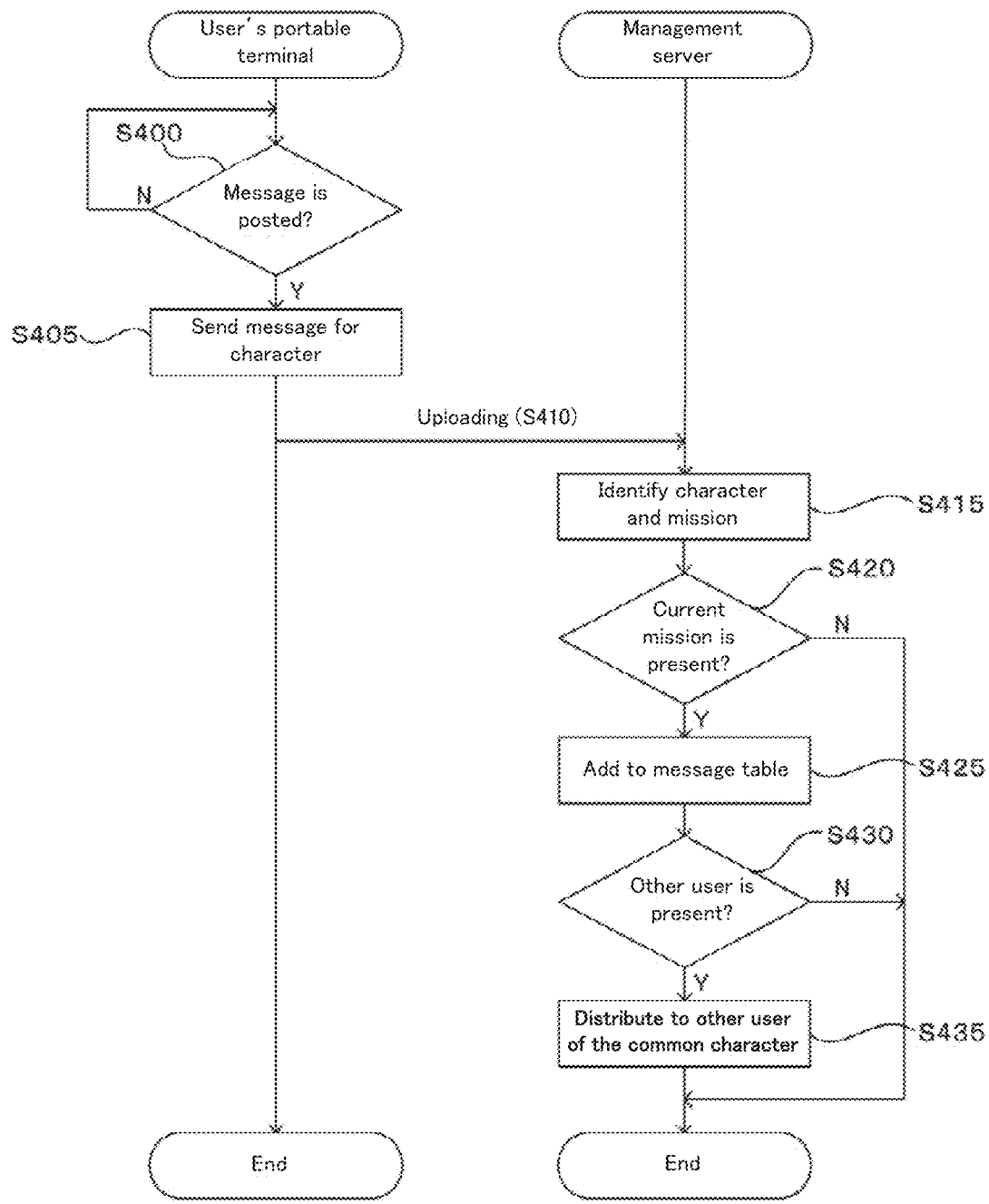
FIG. 14 is a flow chart of message issuing processing (S40)

FIG. 14 is a flow chart of message issuing processing (S40). Although this flow chart shows a configuration by way of example in which a message is issued from the portable terminal 3 of the user, a message may be issued from the fixed terminal 2.

As shown in FIG. 14, in Step 400 (S400), the message exchanging section 358 of the portable terminal 3 waits until the user instructs posting of a message (S400: No), and transitions to processing in S405 when posting of a message is instructed (S400: Yes).

In Step 405 (S405), the message exchanging section 358 transmits the user ID (that is, transmitter ID), the character ID of the character to be addressed, and the mission ID together with the message inputted by the user to the management server 4. In the case where the transmitted message is a response to the parent message or the like, the message ID of the parent message is also transmitted at the same time.

In Step 410 (S410), the message receiving section 560 of the management server 4 receives information from the message exchanging section 358.

In Step 415 (S415), based on the received information, the message receiving section 560 identifies the character and the mission.

In Step 420 (S420), based on the identified character and mission, the message receiving section 560 determines whether or not the current mission is present, and transitions to processing in S425 when the current mission is present (S420: Yes), and finished processing when not present (S420: No).

In Step 425 (S425), based on the information from the message exchanging section 358, the message receiving section 560 adds the message or the like to the message table.

In Step 430 (S430), the message transmitting section 570 determines whether or not other users associated with the common character and mission for the added message are present, and transitions to processing in S435 when other users (including the parent user) are present (S430: Yes), and finishes processing when not present (S430: No).

In Step 435 (S435), the message transmitting section 570 transmits the added message to the fixed terminal 2 or the portable terminal 3, which is associated with the common character and mission for the added message. Referring to the block table, the message transmitting section 570 does not distribute the message to the user who is prohibited from distribution (blocked user).

Figure 18:
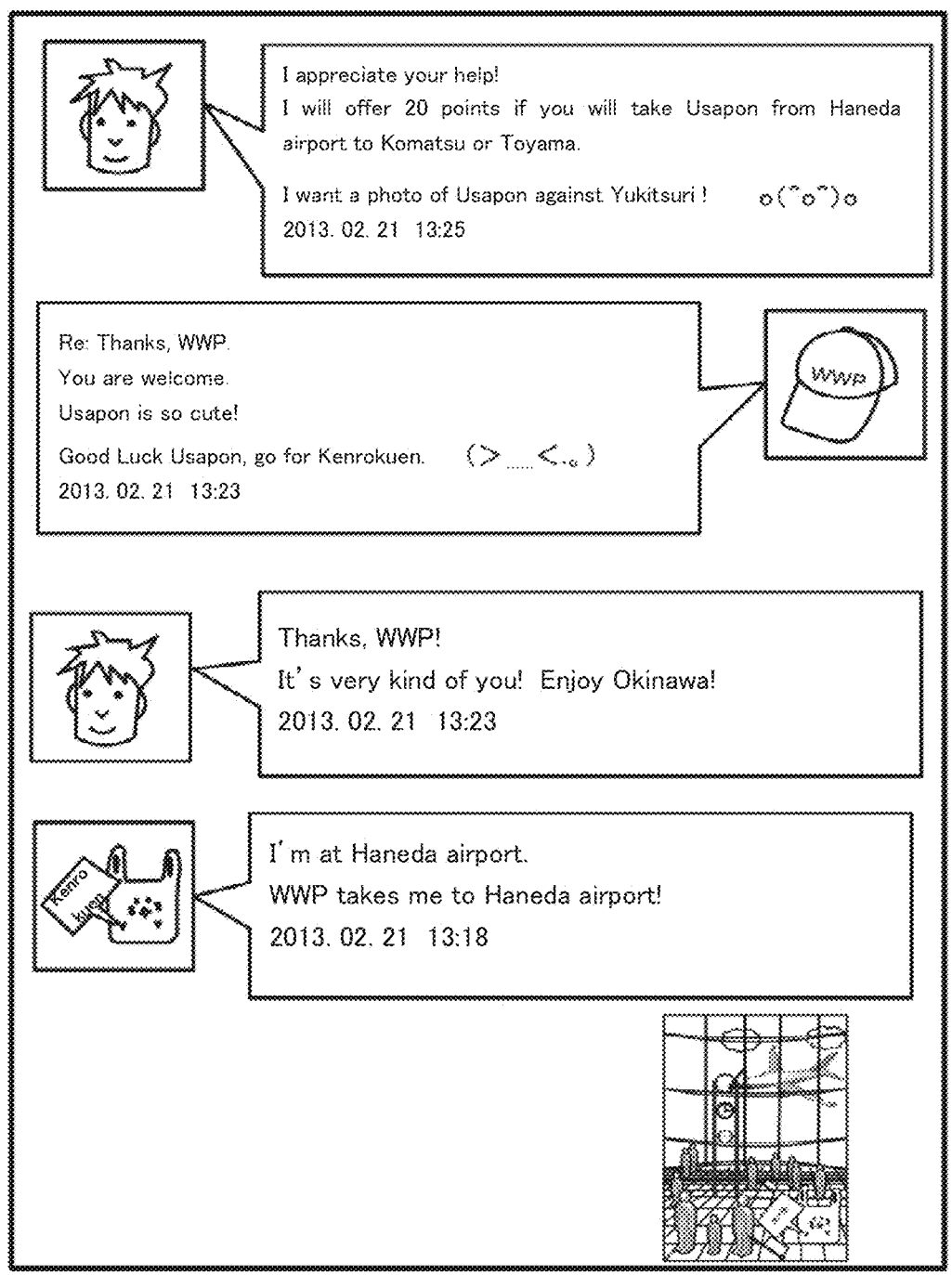
FIG. 18 is one example of a screen for message exchange.

As described above, the character hitchhike system 1 can exchange messages centering on the character 900. All related persons can share feelings, ideas, and the like for mission completion. For example, as shown in FIG. 18, the parent user and other users, who are associated with the common character 900, exchange messages in a thread form on a message board.

As has been described, according to the character hitchhike system 1 in this embodiment, a plurality of users can work together toward completion of the mission set to the character, thereby forming a community centering on the character. Exchange of messages and sharing of extended real photos will increase a sense of belonging to the community. To complete a mission of a character, users are required to actually move. Therefore, an increase in exchanges of tourists and visitors is accomplished.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device for managing a character which is assignable to a portable terminal, responsive to selection by the portable terminal, to achieve a target assigned to the character, in accordance with a location of the portable terminal, the information processing device comprising:

a wireless communication unit configured to wirelessly communicate with the portable terminal;

a storage unit configured to store location information on real space associated with a character displayed on the portable terminal, the location information on real space indicating a location of the portable terminal associated with the character;

a location updating unit configured to, when the character is associated with another portable terminal from the portable terminal, update the location information stored in the storage unit based on location information of the another portable terminal; and an associating unit configured to, when the character is not associated with any portable terminal, associate the portable terminal with the character based on the location information stored in the storage unit and the location information of the portable terminal, wherein the storage unit stores target information representing the target associated with the character, and the information processing device further comprises:

a determining unit configured to determine, based on the location information of the character and the target information stored in the storage unit, whether the target of the character is attained; and an image providing unit configured to, when an image captured by the portable terminal is combined with an image of a character to generate a combined image, provide different images of the character that varies according to the target information associated with the character.

2. The information processing device according to claim 1, further comprising a bonus providing unit configured to provide a bonus to the portable terminal associated with the character when the determining unit determines that the target of the character is attained.

3. The information processing device according to claim 1, wherein the image providing unit provides to the portable terminal the image of the character, the image including an image representing or indicating the target information to a portable terminal.

4. The information processing device according to claim 1, further comprising:

a distributing unit configured to distribute to a viewer the location information of the character stored in the storage unit; and a bonus providing unit configured to provide a bonus to the portable terminal associated with the character in response to a request from the viewer.

5. The information processing device according to claim 4, wherein:

the storage unit stores an identification information of the portable terminal associated with each character associating the character; and the distributing unit distributes, to each portable terminal associated with a common character which is associated with the portable terminal at a point of time, information of the character based on the identification information of the portable terminal stored in the storage unit.

6. The information processing device according to claim 5, wherein the bonus providing unit provides the bonus, in response to a request from the portable terminal associated with the character, to other portable terminals associated with the common character.

7. The information processing device according to claim 6, further comprising:

a message receiving unit configured to receive a message sent to the character; and a message transmitting unit configured to transmit the message received by the message receiving unit, to the portable terminal associated with the character.

8. An information processing system comprising:

a portable terminal and an information processing device for managing a character which is assignable to the portable terminal, responsive to selection by the portable terminal, to achieve a target assigned to the character, in accordance with a location of the portable terminal, wherein the information processing device includes:

a wireless communication unit configured to wirelessly communicate with the portable terminal;

a storage unit configured to store location information on real space associated with a character displayed on a portable terminal, the location information on real space indicating a location of the portable terminal associated with the character;

a location updating unit configured to, when the character is associated with another portable terminal from the portable terminal, update the location information stored in the storage unit based on the location information of the another portable terminal; and an associating unit configured to, when the character is not associated with any portable terminal, associate the portable terminal with the character based on the location information stored in the storage unit and the location information of the portable terminal, the portable terminal transmits location information of the portable terminal to the information processing device, at least when associated with the character, the storage unit stores target information representing the target associated with the character, and the information processing device further comprises;

a determining unit configured to determine, based on the location information of the character and the target information stored in the storage unit, whether the target of the character is attained; and an image providing unit configured to, when an image captured by the portable terminal is combined with an image of a character to generate a combined image, provide different images of the character that varies according to the target information associated with the character.

9. A non-transitory computer-readable medium storing thereon a computer program for managing a character which is assignable to a portable terminal, responsive to selection by the portable terminal, to achieve a target assigned to the character, in accordance with a location of the portable terminal, the program causing a computer to perform a method comprising:

wirelessly communicating with the portable terminal;

updating a location information of a character on real space stored in a database, when the character is associated with another portable terminal from the portable terminal, based on the location information of the another portable terminal, the location information of the character on real space indicating a location of the portable terminal associated with the character;

associating the portable terminal with the character, when the character is not associated with any portable terminal, based on the location information stored in the database and the location information of the portable terminal;

storing target information representing the target associated with the character;

determining, based on the location information of the character and the stored target information, whether the target of each character is attained; and when an image captured by the portable terminal is combined with an image of a character to generate a combined image, providing different images of the character that varies according to the target information associated with the character.

\* \* \* \* \*